United States Patent
Määttä et al.

(10) Patent No.: US 8,186,406 B2
(45) Date of Patent: May 29, 2012

(54) APPARATUS FOR SEALING A POLYMER COATED PAPER OR BOARD

(75) Inventors: Päivi Määttä, Imatra (FI); Pëtri Laakso, Lappeenranta (FI); Jari Hovikorpi, Kotka (FI); Raimo Penttilä, Lappeenranta (FI); Nina Miikki, Imatra (FI); Risto Vesanto, Imatra (FI)

(73) Assignee: Stora Enso Oyj, Helsinki (FI)

( * ) Notice: Subject to any disclaimer, the term of this patent is extended or adjusted under 35 U.S.C. 154(b) by 991 days.

(21) Appl. No.: 10/585,784

(22) PCT Filed: Jan. 12, 2005

(86) PCT No.: PCT/FI2005/000014
§ 371 (c)(1),
(2), (4) Date: Aug. 17, 2007

(87) PCT Pub. No.: WO2005/068173
PCT Pub. Date: Jul. 28, 2005

(65) Prior Publication Data
US 2008/0128079 A1 Jun. 5, 2008

(30) Foreign Application Priority Data
Jan. 13, 2004 (FI) .................................. 20040033

(51) Int. Cl.
*B32B 37/00* (2006.01)
(52) U.S. Cl. .................... 156/379.8; 156/272.8; 156/499
(58) Field of Classification Search .............. 156/272.2, 156/272.8, 273.3, 275.1, 379.6, 379.8, 380.9, 156/308.2, 308.4, 309.6; 219/121.63, 121.64
See application file for complete search history.

(56) References Cited

U.S. PATENT DOCUMENTS

| | | | |
|---|---|---|---|
| 4,540,392 A | 9/1985 | Junod et al. | |
| 5,792,301 A | 8/1998 | Calvert et al. | |
| 6,060,681 A | 5/2000 | Bachhofer et al. | |

FOREIGN PATENT DOCUMENTS

| | | |
|---|---|---|
| DE | 38 13 570 A1 | 11/1989 |
| DE | 198 15 439 A1 | 10/1999 |
| EP | 0 237 192 | 9/1987 |
| EP | 1 016 492 A2 | 7/2000 |

(Continued)

OTHER PUBLICATIONS

Machine translation of JP 06182571 date unknown.*

(Continued)

*Primary Examiner* — John Goff
(74) *Attorney, Agent, or Firm* — Birch, Stewart, Kolasch & Birch, LLP

(57) ABSTRACT

The invention relates to a method and an apparatus for jointing members made of plastic-coated paper or board. In accordance with the invention, the sealable members are retained in position with clamps and sealing is performed with a laser sealing means moving along the sealing line, a means for opening the seal point pressing the members apart to continue keeping the seal point open, a laser beam being directed to the open seal point for melting the coating plastic and a means for closing the seal pressing finally the members against each other, the plastic jointing the members when solidified. The method is applicable to lateral sealing of bag or container packages formed of blanks, among other things.

3 Claims, 2 Drawing Sheets

FOREIGN PATENT DOCUMENTS

Figure 1:
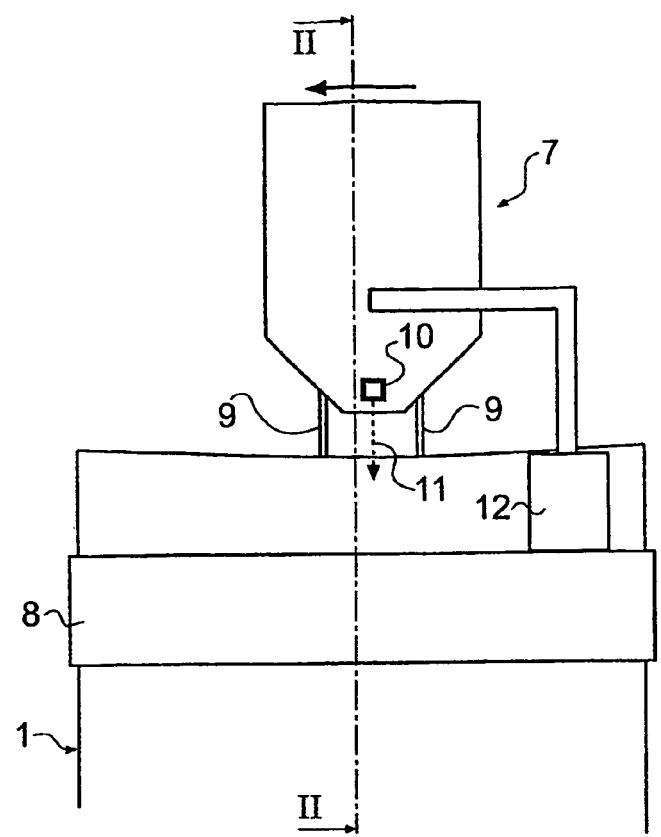

| | | |
|---|---|---|
| EP | 1 069 984 B1 | 1/2001 |
| JP | 60-157842 A | 8/1985 |
| JP | 06182571 A * | 7/1994 |
| JP | 2001-179839 A | 7/2001 |
| JP | 2003-251699 A | 9/2003 |
| JP | 2003-320585 A | 11/2003 |
| JP | 2004-329223 A | 11/2004 |

OTHER PUBLICATIONS

Japanese Office Action issued on Jan. 12, 2010 in corresponding Japanese Patent Application No. 2006-548325 with English translation.

* cited by examiner

APPARATUS FOR SEALING A POLYMER COATED PAPER OR BOARD

The invention relates to a method for sealing members made of plastic-coated paper or board, the method comprising jointing of the members along a sealing line by melting the plastic coating of at least one of the members by means of a laser beam, the coating adhering the members to each other when solidifying. The invention also relates to an apparatus for implementing this method.

Sealing plastic-coated paper or board with a laser beam is previously known in the field of packaging technology. EP 1 069 984 B1 describes a process, in which a continuously moving polyethene-coated board web unwound from a roll is bent and sealed to form a tube by means of a laser sealing means placed on the web path, liquid to be packaged is fed into the tube, and finally the tube filled with liquid is divided into individual liquid packages by sealing in the cross direction of the web.

U.S. Pat. No. 4,540,392 discloses a method for forming a tube of a plastic-coated board, in which the edge of a board web or sheet moving on a conveyor belt is exposed to a laser beam from a laser beam placed adjacent to the conveyor, the laser beam melting the plastic coating of the board, and in which the web or sheet is subsequently bent around a cylindrical mould in order to place the edges of the web or sheet in abutment and to adhere them to each other by means of the melted plastic.

The known methods mentioned above have the characteristic feature of the trajectory of the paper or board to be sealed requiring considerable space on each side of the stationary laser sealing means. This is impractical, especially when previously cut and worked individual blanks are sealed to form partially or completely closed packages.

The purpose of the invention is thus to provide a solution allowing reduction of the space requirement e.g. in a laser sealing means included in a packaging machine, the laser sealing means performing jointing of the polymer surfaces of opposed paper or board members with a view to closing the sides or ends of e.g. a package bent or folded from a sheet-like blank. The method of the invention is characterised by gripping the members made of plastic-coated paper or board to be sealed adjacent to the sealing line for retaining the members in position during the sealing and by performing the sealing with a sealing means moving along the sealing line and pressing the members apart for keeping the sealing point open and directing a laser beam to the open seal point for melting the plastic and finally pressing the members against each other to close the seal.

Thus the method of the invention has the central feature of comprising as a moving element, instead of the web or blank to be sealed, a laser sealing means moving along the sealing line, which not only melts the plastic coating of the paper or board but also closes the seal point. The object of sealing, such as e.g. a package blank or package, whose sides or ends are to be sealed, remains in position during the sealing process.

In a continuously operating automated sealing process, the laser sealing means can be disposed to perform reciprocating movements, with the reverse movement subsequent to the sealing movement returning the sealing means to the starting position, where it is ready for the following sealing movement. The sealing means can optionally be constructed such that produces a seal also during its reverse movement, thus allowing enhanced performance of the sealing means.

The members to be sealed, such as previously bent or folded paper or board blanks, can be piled adjacent the sealing means so that they move towards the sealing means in a direction perpendicular to the sealing means direction while one blank at a time is sealed, and that they are removed to the opposite side of the sealing means after sealing. It is also conceivable to bring the blanks on the sealing line and to remove them one by one after sealing by a reciprocating vertical movement perpendicular to the sealing means movement. In either case, the arrangement allows for space saving in the packaging machine.

In one embodiment of the invention, one of the paper or board members to be jointed is sealed at a fold formed at its edge with the members overlapping along the sealing line. This is an advantageous solution e.g. when bent paper or board is sealed as a tube, the sealing producing a tubular sleeve that is as simple as possible and is double-layered along the sealing line.

The sealing can be directed to a package blank made of plastic-coated paper or board, whose edges are placed in abutment and sealed to each other. The first sealing step may e.g. comprise production of the lateral seal of the package, the sealing converting the bent or folded blank into a tube. The closing of the package by sealing the ends of the tube thus obtained can also take place by the operations in accordance with the invention.

Preferred objects of application of the invention include the lateral seals of container packages formed of plastic-coated board and the lateral and end seals of bag packages formed of plastic-coated paper.

The apparatus of the invention allowing the sealing method described above to be performed comprises the following central parts: clamps for retaining two paper or board members in position, locates with respect to each other and to the sealing line, and a laser sealing means movable along the sealing line and comprising means for opening the sealing point by pressing the members to be sealed apart, a laser beam for directing the laser beam melting the plastic coating to the opened sealing point, and last, a seal closing means for pressing the members against each other. The seal point opening means may comprise two successive wedge-shaped elements pushing in between the paper or board members along the sealing line, the laser beam being disposed to direct a laser beam to the seal point between said elements. The opening means can optionally consist of e.g. a tube that is inserted between the members to be sealed and through which the laser beam is directed to the seal point. The tube may act simultaneously as a duct for blowing any protective gas that may be required. The laser beam may be a $CO_2$ laser. The clamps, again, may consist of jaws, between which the paper or board members to be sealed are clamped.

Figure 2:
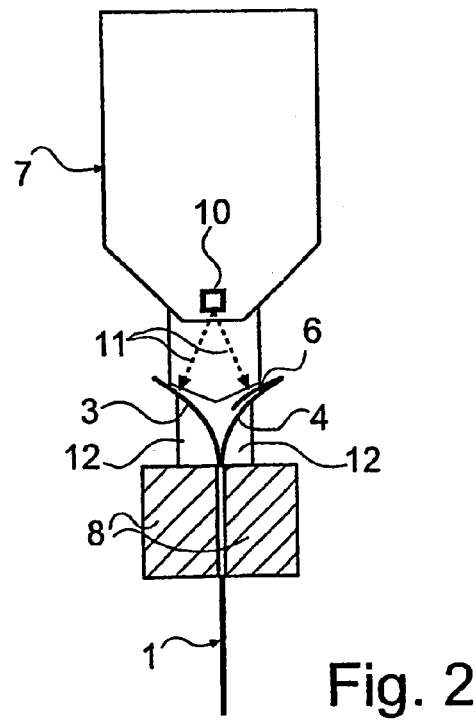
Figure 3:
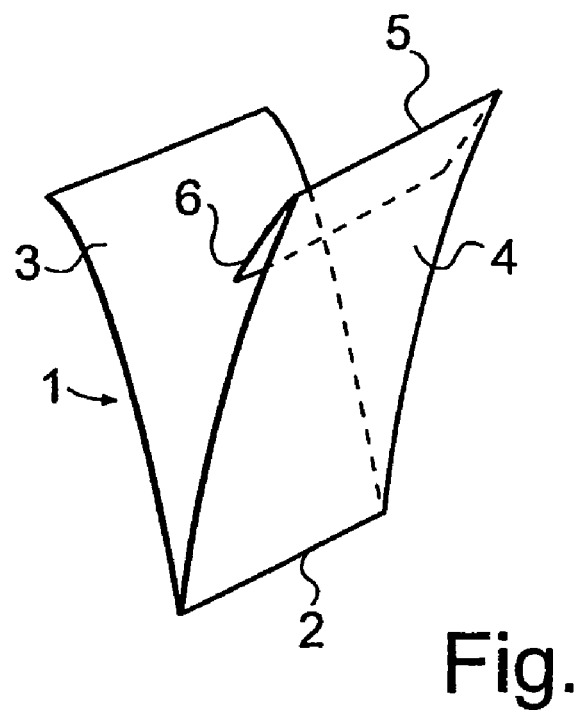
Figure 4:
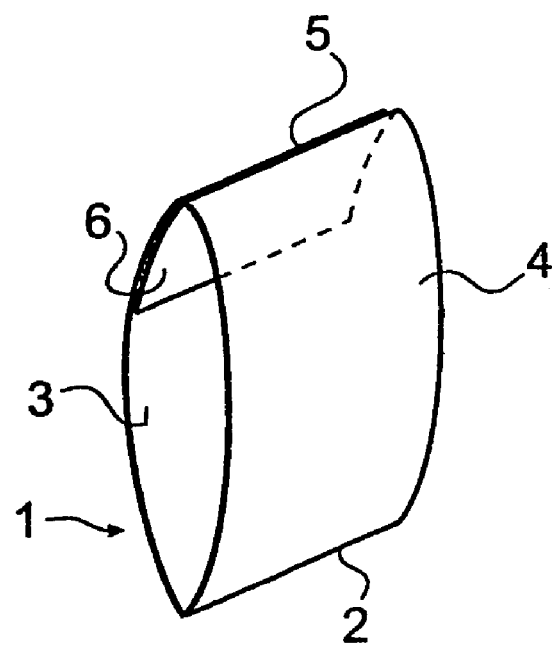

The invention is explained in greater detail below with reference to the accompanying drawings, in which FIG. 1 is a lateral view of a sealing means of the invention and parts of a packaging board blank to be sealed, FIG. 2 is a section II-II of FIG. 1, FIG. 3 shows a creased package blank made of board before the sealing is performed as shown in FIGS. 1 and 2, and FIG. 4 shows the blank of FIG. 3 sealed in the form of a tube.

First, with reference to FIG. 3, the object of the laser sealing of the invention is a blank 1, which is made of packaging board coated on both sides with heat-sealable polymer, such as e.g. low-density polyethene (LDPE) and is divided with a crease 2 so as to produce two equal lateral surfaces 3, 4 in the blank, with an edge part 6 separated from its one edge with a crease 5 and turned between the opposite sides 3, 4 of the blank. The sealing of the invention allows the blank 1 of FIG. 3 to be converted to the tube 1' of FIG. 4, in which the edge part 6 defined by the crease 5 and the opposite side 3 of the blank are sealed to each other at facing surfaces by means of the heat-sealable polymer.

The sealing of the blank 1 of FIG. 3 in the form of the tube 1' of FIG. 4 can be performed by means of the reciprocating laser sealing means 7 shown in FIGS. 1 and 2. The blank 1 is gripped adjacent to the sealing point, slightly below the blank members 3, 6 to be jointed in FIG. 2, using clamps consisting of a pair of jaws 8 pressed against the opposite sides 3, 4 of the blank. The sealing means 7 is equipped with two wedge-shaped elements 9 successive in the direction of movement of the sealing means, which are intended for keeping the seal point open while the laser beam 11 is directed from the laser head 10 of the sealing means. The laser head 10, which is e.g. a $CO_2$ laser, is located between the wedge-shaped means 9 for opening the seal point in the direction of movement of the sealing means, and is disposed to direct the laser beam 11 to the seal surfaces of the blank members 3, 6 to be jointed in order to melt the coating polymer on these. An inert protective gas to prevent combustion of the polymer may surround the laser beam 11. The sealing surfaces are jointed by the means 12 for closing the seal point following after the laser head beam 10 and the wedge-shaped opening elements 9, this means being an integrated part of the moving apparatus assembly forming the sealing means 7. The means 12 for closing the seal point consists of parts located on opposite sides of the blank 1 and directing the edge crease 6 on one side 4 of the blank and the edge part on the opposite side 3 of the blank towards each other, the coating polymer forming a tight heat-sealed joint between the surfaces when cooling and solidifying. The opposite parts of the closing means 12 can be shaped as a rearward tapered throat directing the sealable parts of the blank 1, or the parts may be rotating rolls, with the sealable parts of the blank 1 being directed into the nip between these.

When the sealing movement of the sealing means 7 starts, the wedge-shaped front opening means 9 on the right-hand side in FIG. 1 is disposed to press the edge parts 3, 6 of the blank so as to open the seal point. The laser head 10 is activated and the sealing means 7 performs the sealing movement from the right to the left in FIG. 1 so that the laser beam 11 sweeps along the sealing line across the blank 1 from the right edge to the left edge of the blank in FIG. 1. The movement of the sealing means 7 is continued until the seal closing means 12 following after the 5 laser beam 10 reaches the left-hand edge of the blank 1. Then the sealed blank is removed from the sealing means, the sealing means resumes its starting position mentioned above, and a new blank is brought supported on the pair of jaws 8 to the sealed by the sealing means as explained above.

It is obvious to those skilled in the art that the embodiments of the invention are not confined to the examples given above, but may vary within the following claims. Thus, for instance, the wedge-shaped opening means 9 can be replaced with a tube mounted as a coaxial extension of the laser head 10, through which the laser beam is directed to the laser point and which simultaneously acts as a duct for supplying protective gas.

The invention claimed is:

1. An apparatus for sealing members made of plastic-coated paper or board by a method comprising
    jointing of the members along a sealing line melting the plastic coating of at least one member with a laser beam, the plastic coating adhering the members to each other when solidified, wherein the members to be sealed are gripped adjacent the sealing line in order to retain the embers in position during the sealing and
    performing sealing by means of to sealing means which moves along the sealing line and presses the members apart in order to keep a seal point open, directs a laser beam to the open seal point for melting the plastic, and finally presses the members against each other for closing the seal, the laser sealing means performing a reciprocating movement,
    wherein said apparatus comprises a clamp for retaining two paper or board members in position, located with respect to each other and to a sealing line, and a laser sealing means movable along the sealing line, said laser sealing means comprising
    (i) a means for opening the seal point by pressing sealable members apart, said means for opening the seal point comprising two successive elements pushing in between the paper or board members along the sealing line,
    (ii) a laser head for directing a laser beam melting a plastic coating to the opened seal point located between said two successive elements, and
    (iii) as the last, a seal closing means for pressing the members against each other,
    said means for opening the seal point, said laser head, and said seal closing means being disposed to form an integral unit so that a reciprocating movement is performed along the sealing.

2. The apparatus as defined in claim 1, wherein the two successive elements are wedge-shaped.

3. The apparatus as defined in claim 1 or 2 wherein the clamp has jaws, between which the two paper or board members to be sealed are clamped.

\* \* \* \* \*